(12) United States Patent
Kuo et al.

(10) Patent No.: US 9,080,718 B2
(45) Date of Patent: Jul. 14, 2015

(54) DISPLAY LIFTING DEVICE

(71) Applicant: SYNCMOLD ENTERPRISE CORP., New Taipei (TW)

(72) Inventors: Chin-Hsing Kuo, New Taipei (TW); Wei-Hsiang Hsiu, New Taipei (TW); Fong-Ci Syu, New Taipei (TW); Cheng-Yu Huang, New Taipei (TW); Lung-Yu Chang, New Taipei (TW); Chin-Cheng Hsu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 109 days.

(21) Appl. No.: 14/087,505

(22) Filed: Nov. 22, 2013

(65) Prior Publication Data

US 2015/0053830 A1  Feb. 26, 2015

(30) Foreign Application Priority Data

Aug. 20, 2013  (TW) .............................. 102215617 U

(51) Int. Cl.
*F16M 11/04* (2006.01)
*F16M 13/02* (2006.01)
*G06F 1/16* (2006.01)

(52) U.S. Cl.
CPC ........... *F16M 11/046* (2013.01); *F16M 13/022* (2013.01); *G06F 1/1601* (2013.01)

(58) Field of Classification Search
CPC ... F16F 11/043; F16F 11/046; F16F 11/2021; G06F 1/1601; G06F 1/1607
USPC ................. 248/121, 125.2, 123.11, 917, 919; 361/679.04, 679.05, 679.06, 679.07, 361/679.21, 679.22
See application file for complete search history.

(56) References Cited

U.S. PATENT DOCUMENTS

| | | | | |
|---|---|---|---|---|
| 5,400,721 A * | 3/1995 | Greene | .......................... | 108/147 |
| 7,677,540 B1 * | 3/2010 | Duval | ........................... | 267/179 |
| 8,272,617 B2 * | 9/2012 | Huang | ........................... | 248/422 |
| 8,596,591 B2 * | 12/2013 | Theis et al. | ................. | 248/125.2 |
| 2006/0185563 A1 * | 8/2006 | Sweere et al. | ................... | 108/28 |
| 2008/0026892 A1 * | 1/2008 | Asamarai et al. | ............... | 474/84 |
| 2008/0099637 A1 * | 5/2008 | Pai | ................. | 248/157 |
| 2008/0210841 A1 * | 9/2008 | Tseng | ........................... | 248/422 |
| 2012/0187256 A1 * | 7/2012 | Ergun et al. | .............. | 248/123.11 |

(Continued)

FOREIGN PATENT DOCUMENTS

TW  M448598 U1  3/2013

OTHER PUBLICATIONS

English Abstract of TW M448598.

*Primary Examiner* — Ryan Kwiecinski
(74) *Attorney, Agent, or Firm* — Steptoe & Johnson LLP

(57) ABSTRACT

A display lifting device includes: a body; an adjusting unit having big and small wheels coaxially disposed on the body, a shaft fixed to the body, and a rock arm pivotally fixed to the shaft and having first and second arms; a spring having one end fixed to the body; a first rope member wound on the small wheel and having two ends connected to the first arm and the other end of the spring, respectively; and a second rope member wound on the small and big wheels and having one end connected to the second arm, and a sliding unit for carrying a display such that the display is movable between a first position and a second position. Since the sum of torques produced on the first and second arms is kept equal to zero, the display can stop at any position between the first and second positions.

12 Claims, 8 Drawing Sheets

(56) References Cited

U.S. PATENT DOCUMENTS

| | | | |
|---|---|---|---|
| 2013/0025393 A1* | 1/2013 | Lee et al. | 74/411 |
| 2014/0034799 A1* | 2/2014 | Fallows et al. | 248/297.21 |
| 2014/0077050 A1* | 3/2014 | Huang | 248/297.11 |
| 2015/0001355 A1* | 1/2015 | Huang | 248/123.11 |
| 2015/0102188 A1* | 4/2015 | Aoyagi et al. | 248/125.1 |

\* cited by examiner

DISPLAY LIFTING DEVICE

BACKGROUND OF THE INVENTION

1. Field of the Invention

The present invention relates to display lifting devices, and, more particularly, to a display lifting device having a mechanism of static equilibrium.

2. Description of Related Art

FIG. 1A shows a display lifting device as disclosed by Taiwan Patent No. M448598. Referring to FIG. 1A, the display lifting device has an elastic member 90, a fixed pulley 911, a connecting member 92, and a connecting rod 93. The fixed pulley 911 is rotatable about a first pivot axis 914 and has an arm-shaped rotating portion 912 disposed at a periphery thereof. The connecting rod 93 has one end connected to the elastic member 90 and the other end connected to the rotating portion 912 of the fixed pulley 911. The connecting member 92 has one end connected to the rotating portion 912 of the fixed pulley 911 and the other end connected to a lifting member (not shown) that carries a display. Further, a deflecting pulley 94 is provided to change the direction of the connecting member 92. Deformation of the elastic member 90 can apply a force to the rotating portion 912 at a distance from the first pivot axis 914 so as to produce a torque that is equal to a torque produced by gravity of the lifting member. As such, when the lifting member moves to cause the connecting member 92 to move, the position of the connecting rod 93 is changed, as shown in FIG. 1B, such that the whole mechanism reaches a static equilibrium and therefore the lifting member that carries the display can stop at any position.

SUMMARY OF THE INVENTION

In view of the above-described drawbacks, the present invention provides a display lifting device, which comprises: a body, an adjusting unit, a spring, a first rope member, a second rope member, and a sliding unit. The adjusting unit has a wheel group having a big wheel and a small wheel coaxially disposed on the body, a shaft fixed to the body, and a rock arm member pivotally fixed to the shaft and having a first arm and a second arm extending outward from the shaft. The spring has a first end fixed to the body. The first rope member is wound on the small wheel and has one end connected to the first arm and the other end connected to a second end of the spring. The second rope member is wound on the small wheel and the big wheel and has one end connected to the second arm. The sliding unit is connected to the other end of the second rope member for carrying a display such that the display is movable between a first position and a second position. Therein, a first angle ($\theta_l$) is formed between the first rope member and the first arm and a second angle ($\theta_r$) is formed between the second rope member and the second arm. When the display moves from the first position toward the second position, the second rope member is pulled to cause the second arm and the first arm to pivotally rotate relative to the shaft and thereby cause the first rope member to stretch the spring such that the first angle and the second angle vary with extension of the spring, thereby keeping the sum of torques produced on the first arm and the second arm with respect to the shaft equal to zero.

In an embodiment, the display lifting device further comprises a base pivotally connected to the body through a hinge.

In an embodiment, the big wheel has a through hole through which the second rope member wound on the small wheel passes so as to be wound on the big wheel.

In an embodiment, an angle is formed between the first arm and the second arm. The angle can be an obtuse angle.

In an embodiment, the first arm has a first groove connected with the first rope member, and the second arm has a second groove connected with the second rope member.

In an embodiment, the sliding unit comprises at least an outer rail fixed to the body, an inner rail slidingly disposed on the outer rail, and a sliding block fixed to the inner rail.

In an embodiment, the display lifting device further comprises a cover disposed on the body and positioned between the sliding block and the body for fixing the wheel group and the shaft.

In an embodiment, the sliding block further comprises a friction block positioned at a side of the sliding block close to the body, and a frictional force between the friction block and the body is adjusted by tightening or loosening a first screw.

In an embodiment, the first end of the spring is fixed to the body through a second screw, and tension of the spring is adjusted by tightening or loosening the second screw. Further, the second end of the spring has a gradually narrowed structure for fixing the first rope member therein.

In an embodiment, the big wheel and the small wheel have a diameter ratio ranging from 1.5:1 to 15:1.

Therefore, the present invention provides a torque balance on the rock arm member through the first rope member connected to the spring and the second rope member connected to the sliding unit. Compared with the conventional display lifting device and assembly method, the present invention provides simplified elements so as to facilitate the assembly process and overcome the conventional manufacturing difficulty of a cam contour. Therefore, the present invention provides a new-type mechanism of static equilibrium for a display lifting device.

DETAILED DESCRIPTION OF PREFERRED EMBODIMENTS

The following illustrative embodiments are provided to illustrate the disclosure of the present invention, these and other advantages and effects can be apparent to those in the art after reading this specification.

It should be noted that all the drawings are not intended to limit the present invention. Various modifications and variations can be made without departing from the spirit of the present invention.

Figure 1A:
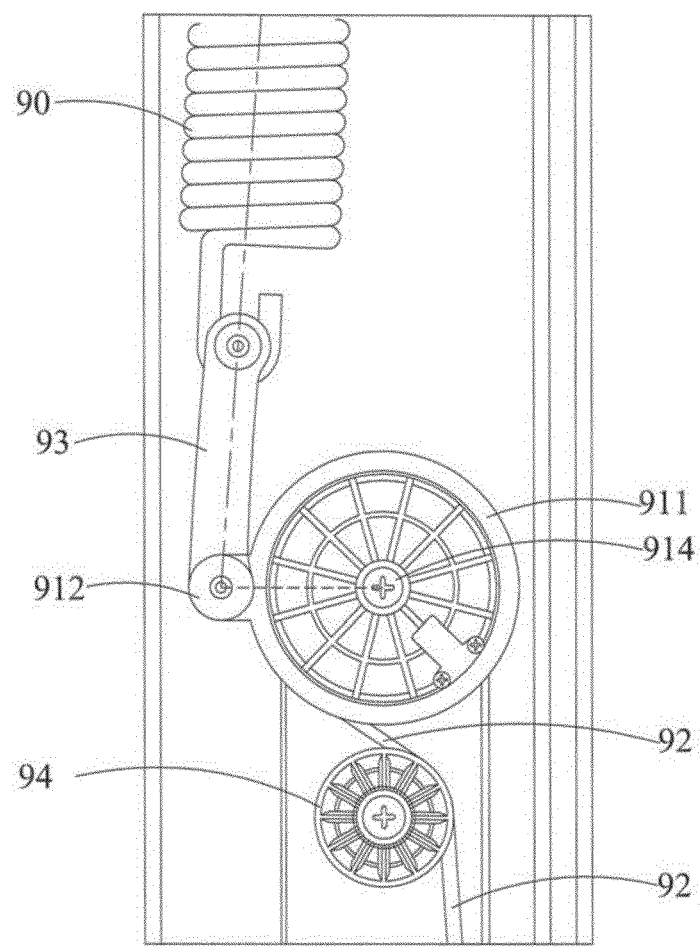
FIGS. 1A and 1B are schematic views of a mechanism of static equilibrium used in a conventional display stand.
Figure 1B:
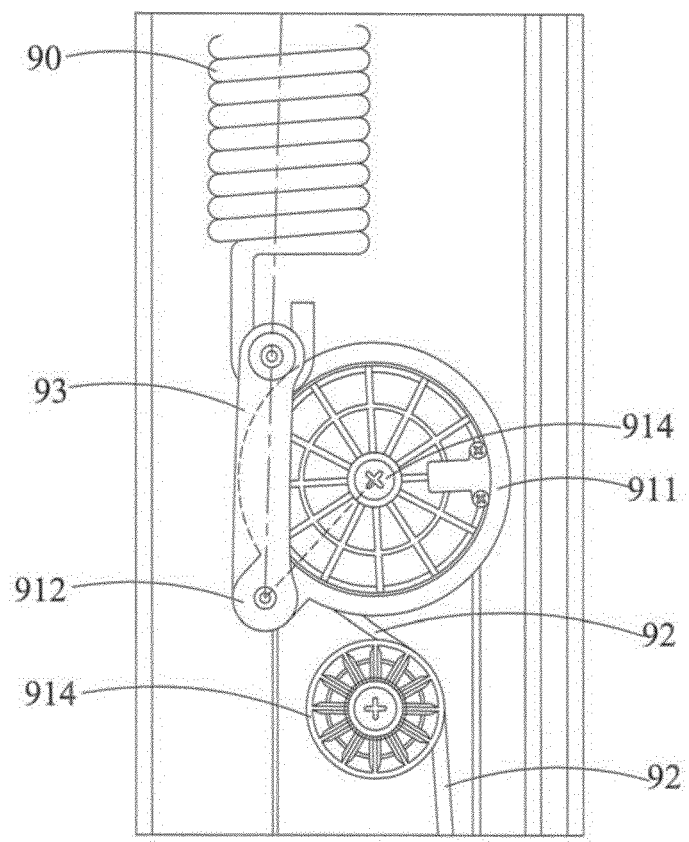
Figure 2:
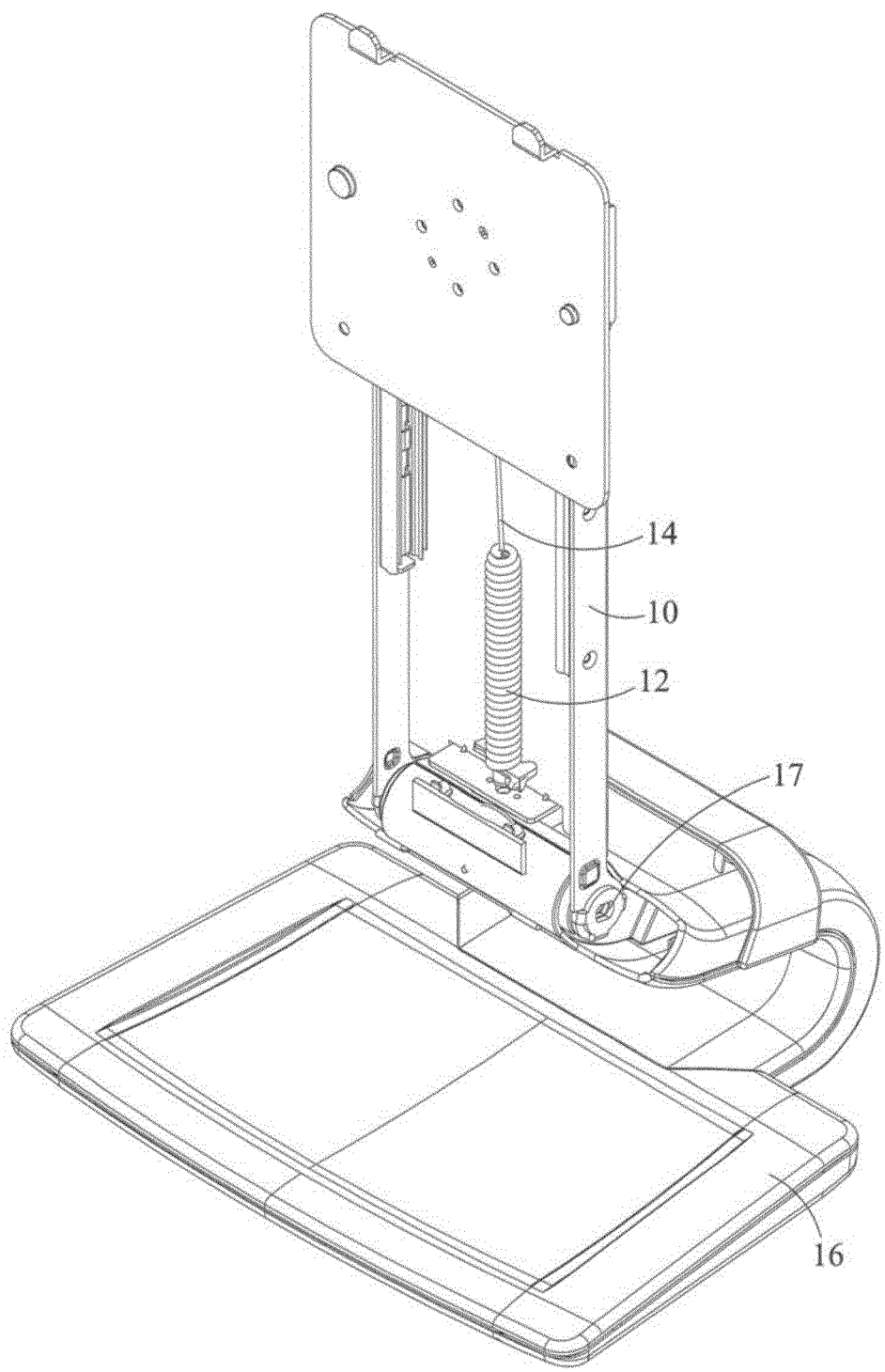
FIG. 2 is a schematic view of a display lifting device according to the present invention.
Figure 3:
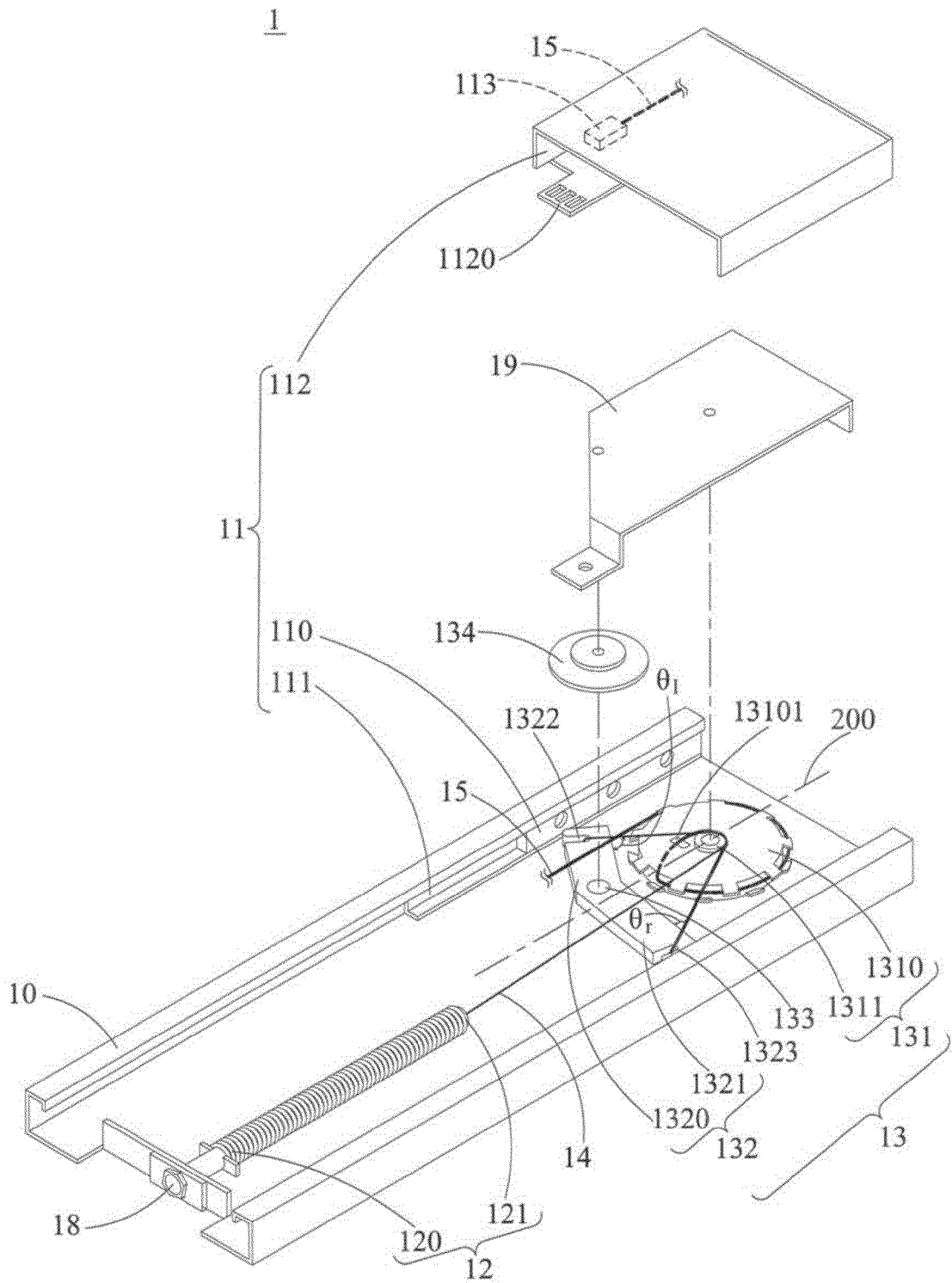
FIG. 3 is an exploded view of the display lifting device according to the present invention.

FIG. 2 shows a display lifting device according to the present invention. FIG. 3 shows an exploded view of the display lifting device. Referring to FIGS. 2 and 3, the display lifting device has a body 10, a sliding unit 11, a spring 12, an adjusting unit 13, a first rope member 14, a second rope member 15, a base 16, and a hinge 17.

The body 10 is made of metal such as sheet metal. The body 10 is pivotally connected to the base 16 through the hinge 17. The sliding unit 11, the spring 12, the adjusting unit 13, the first rope member 14, and the second rope member 15 are disposed on the body 10.

The adjusting unit 13 has a wheel group 131, a shaft 133, and a rock arm member 132. The wheel group 131 has a big wheel 1310 and a small wheel 1311 coaxially disposed on the body 10. The shaft 133 is fixed to the body 10. The rock arm member 132 is pivotally disposed on the shaft 133 and has a first arm 1320 and a second arm 1321 that extend outward from the shaft 133.

In this embodiment, the first arm 1320 and the second arm 1321 are integrally formed of a sheet metal, and an angle is formed between the first arm 1320 and the second arm 1321. Meanwhile, the angle is, but not limited to, an obtuse angle.

The spring 12 is an extension spring, which has a first end 120 connected to the body 10 and a second end 121 connected to the first rope member 14.

Figure 4:
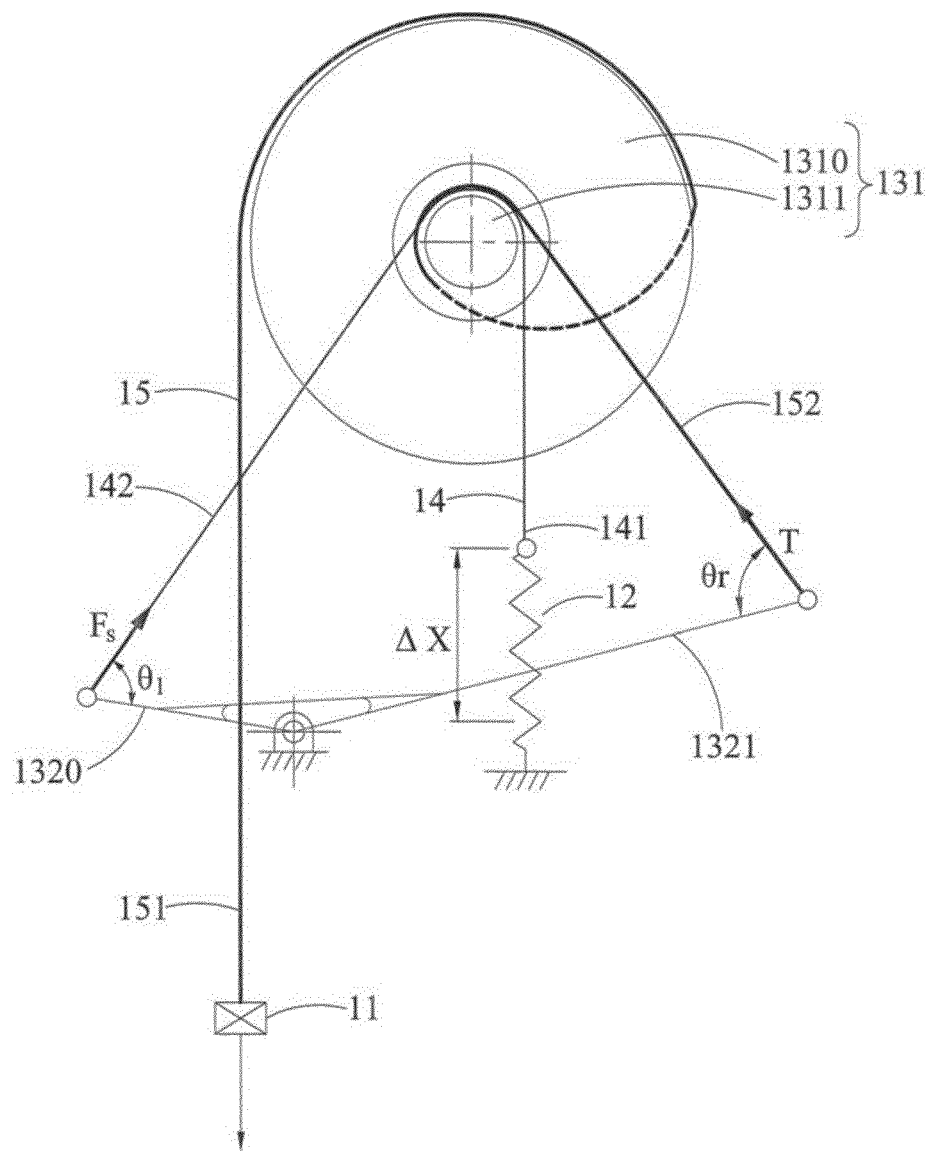
FIG. 4 is a schematic view showing the principle of static equilibrium of the display lifting device according to the present invention.

In this embodiment, the first rope member 14 and the second rope member 15 are ropes. The first rope member 14 is connected to the first arm 1320 of the rock arm member 132 through one end thereof and then wound on the small wheel 1311 so as to be connected to the second end 121 of the spring 12 through the other end thereof. The second rope member 15 is connected to the second arm 1321 of the rock arm member 132 through one end thereof and then sequentially wound on the small wheel 1311 and the big wheel 1310 so as to be connected to the sliding unit 11 through the other end thereof. A first angle of $\theta_l$ is formed between the first rope member 14 and the first arm 1320, and a second angle of $\theta_r$ is formed between the second rope member 15 and the second arm 1321, as shown in FIG. 4.

The sliding unit 11 is used for carrying an object such as a display (not shown), and the object is movable between a first position and a second position. That is, the object can stop at any position along a first axis 200 between the first position and the second position. In this embodiment, referring to FIG. 2, the first position is the highest position distant from the base 16, and the second position is the lowest position proximate to the base 16.

Referring to FIG. 3, the sliding unit 11 has two outer rails 111 disposed on two opposite sides of the body 10, respectively, two inner rails 110 slidingly disposed on the outer rails 111, and a sliding block 112 fixed to the inner rails 110. As such, the sliding block 112 is slidable between the first position and the second position. The sliding block 112 further has a connecting portion 113 connected with the second rope member 15. Therefore, when the sliding block 112 is moved between the first position and the second position, the second rope member 15 is pulled to actuate the rock arm member 132.

As shown in FIG. 2, the second end 121 of the spring 12 has a gradually narrowed structure for engaging with the first rope member 14 so as to fix the first rope member 14 therein. As such, when the first rope member 14 is pulled, the spring 12 can be stretched. The first end 120 of the spring 12 is fixed to the body 10 through a second screw 18, such as a hexagonal screw. The second screw 18 can be screwed in or screwed out with respect to an underlying wallboard, thereby adjusting a distance between the first end 120 of the spring 12 and the underlying wallboard. In this manner, a predetermined amount of extension of the spring 12 can be increased or decreased. Accordingly, the spring 12 can have its pre-extension force adjusted.

In this embodiment, the first arm 1320 has a first groove 1322 connected with the first rope member 14, and the second arm 1321 has a second groove 1323 connected with the second rope member 15.

Further, the big wheel 1310 has a through hole 13101 through which the second rope member 15 wound on the small wheel 1311 passes so as to be wound on the big wheel 1310. The big wheel 1310 and the small wheel 1311 of the wheel group 131 are coaxially disposed such that when the first rope member 14 or the second rope member 15 is pulled, the rope member and the spring have different amount of extension due to different diameters of the big and small wheels 1310, 1311. The big and small wheels 1310, 1311 can have a diameter ratio ranging from 1.5:1 to 15:1. For example, in the case that the big wheel 1310 and the small wheel 1311 have a diameter ratio of 5:1, if the second rope member 15 is pulled 5 cm, the spring 12 is only pulled by 1 cm. As such, the diameter ratio reduces the extension length of the spring 12 so as to protect the spring 12.

Therefore, when the sliding block 112 is at the highest position relative to the base 16, the spring 12 is deformed to apply a force on the first arm 1320. The sum of torques produced by the force on the first arm 1320 and gravity of the sliding block 112 carrying the object (display) on the second arm 1321 with respect to the shaft 133 is substantially zero. On the other hand, when the sliding block 112 is at the lowest position relative to the base 16, the spring 12 is deformed to apply another force on the first arm 1320. The sum of torques produced by the force on the first arm 1320 and gravity of the sliding block 112 carrying the object (display) on the second arm 1321 with respect to the shaft 133 is also substantially zero. In addition, even when the sliding block 112 is at any position between the highest and lowest positions, the sum of torques is zero, the principle of which is detailed later.

As such, when the sliding block 112 is at the highest position, the spring 12 is least stretched, and when the sliding block 112 is at the lowest position, the spring 12 is most stretched. Based on the torque balance theory, the force generated by deformation of the spring on the first arm 1320 produces a clockwise torque that is close to a counter-clockwise torque produced by the gravity of the sliding block 112 on the second arm 1321, and with the help of friction between the elements, if necessary, the display on the sliding block 112 can stop at any position.

Moreover, the display lifting device 1 further has a cover 19 disposed on the body 10 and positioned between the sliding block 112 and the body 10 for fixing the wheel group 131 and the rock arm member 132. As such, the wheel group 131 and the rock arm member 132 are fixed and protected by the cover 19. The sliding block 112 is disposed at a side of the cover 19 distant from the body 10. To prevent the second rope member 15 and the first arm 1320 from interfering with each other in operation, an isolating member 134 can be provided to prevent the second rope member 15 from coming into contact with the first arm 1320.

According to the practical need, the sliding block 112 can further have a friction block 1120 positioned at a side of the sliding block 112 close to the body 10. A frictional force between the friction block 1120 and the body 10 can be adjusted by tightening or loosening a first screw so as to facilitate to achieve a static equilibrium effect mentioned above.

FIG. 4 shows the principle of static equilibrium of the display lifting device according to the present invention.

Referring to FIG. 4, the object (such as the display) carried by the sliding unit 11 (including the inner rails 110, the outer rails 111 and the sliding block 112 of FIG. 3) pulls a first end 151 of the second rope member 15 along the big wheel 1310 and the small wheel 1311 such that a force T is applied on the second arm 1321 through a second end 152 of the second rope member 15 and an angle θ$_r$ is formed between the second end 152 of the second rope member 15 and the second arm 1321. Further, the spring 12 has a deformation of ΔX, thereby generating a force F$_S$ on the first arm 1320 through a second end 142 of the first rope member 14 and forming an angle θ$_l$ between the second end 142 of the first rope member 14 and the first arm 1320.

For the second arm, a counter-clockwise torque M$_r$ is generated with respect to the pivot of the shaft 133.

$$M_r = L_r \cdot Mg \cdot \sin \theta_r \quad (1)$$

Therein, L$_r$ represents the length of the second arm 1321, Mg represents the weight of the display, and θ$_r$ represents the angle between the second arm 1321 and the second end 152 of the second rope member 15.

For the first arm, a clockwise torque M$_l$ is generated with respect to the pivot of the shaft 133.

$$M_l = L_l \cdot F \cdot \sin \theta_l = L_l \cdot (k_s \cdot \Delta x) \cdot \sin \theta_l \quad (2)$$

Therein, L$_l$ represents the length of the first arm 1320, k$_s$ represents the spring constant of the spring, Δx represents the deformation of the spring, and θ$_l$ represents the angle between the first arm 1320 and the second end 142 of the first rope member 14.

When the counter-clockwise torque M$_r$ is equal to the clockwise torque M$_l$, the object carried by the sliding unit 11 keeps unmoved.

If the position of the object carried by the sliding unit 11 changes, the first arm 1320 and the second arm 1321 rotate so as to cause changes of the angle θ$_r$ and the angle θ$_l$. The mechanism of static equilibrium is detailed in FIGS. 5A and 5B.

Figure 5A:
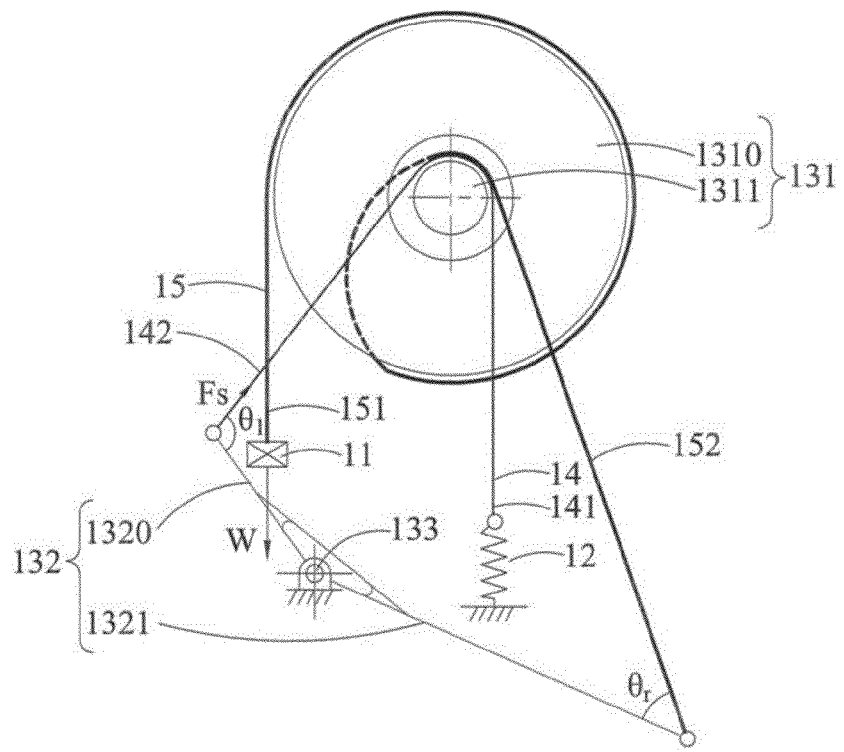
FIGS. 5A and 5B are different views showing a mechanism of static equilibrium of the display lifting device according to the present invention.
Figure 5B:
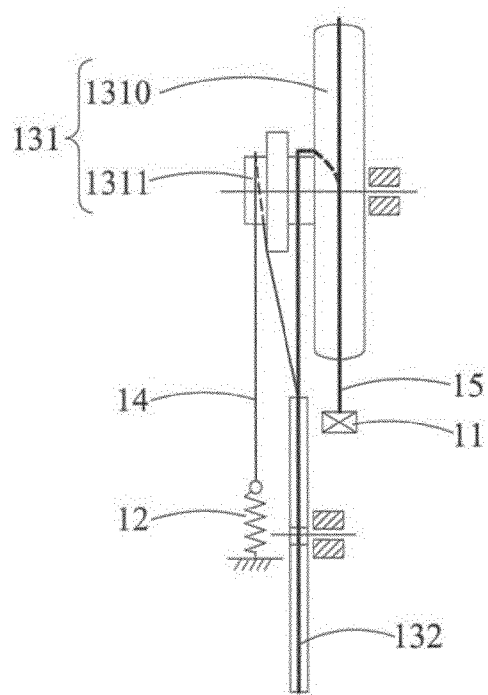

FIGS. 5A and 5B show a state where the object is at the first position, i.e., the highest position. At this state, the extension Δx of the spring 12 has a minimum value, a force Fs has a minimum value, and an angle θ$_l$ formed between the second end 142 of the first rope member 14' and the first arm 1320 has a maximum value, and an angle θ$_r$ formed between the second end 152 of the second rope member 15 and the second arm 1321 has a minimum value. Referring to the drawings, the rock arm member 132 is pivotally disposed on the body 10 of FIG. 2 through the shaft 133 and pivotally rotates about the shaft 133. The first rope member 14 is connected to the first arm 1320 through the second end 142 thereof and then wound on the small wheel 1311 so as to be connected to the spring 12 through the first end 141 thereof. The second rope member 15 is connected to the second arm 1321 through the first end 151 thereof and then wound on the small wheel 1311, passes through the through hole 13101 of FIG. 2 and is wound on the big wheel 1310 so as to be connected to the sliding unit 11 through the second end 152 thereof. The portion of the second rope member located behind the big wheel 1310 is shown in an arc-shaped dashed line in the drawings. The second rope member 15 can be guided by a guiding rail (not shown) on the big wheel 1310 so as to form an arc shape on the big wheel 1310 and then wound around an outer periphery of the big wheel 1310.

Figure 6:
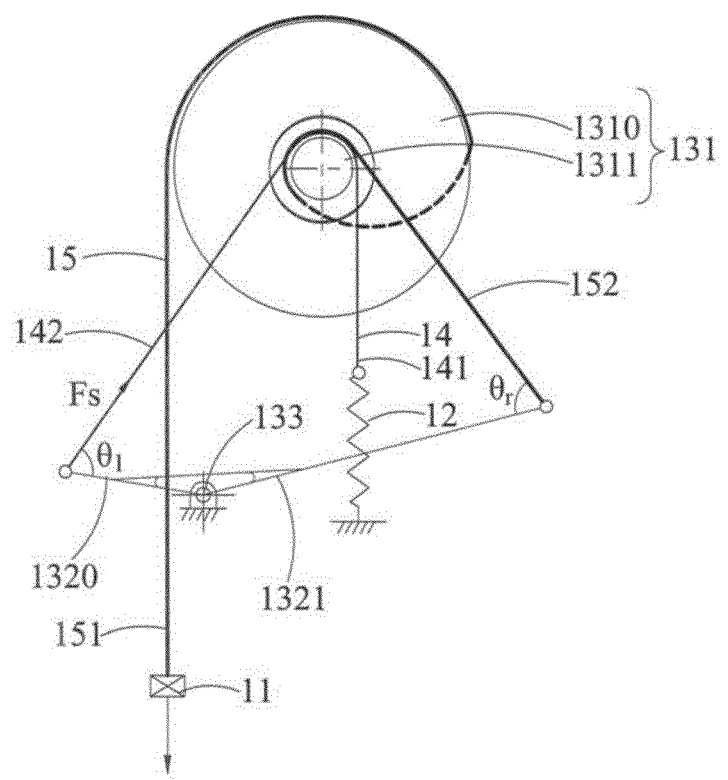
FIG. 6 is a schematic view showing operation of the display lifting device according to the present invention.

FIG. 6 shows a state where the object is at the second position, i.e., the lowest position. At this state, the extension Δx of the spring 12 has a maximum value, a force F$_S$ has a maximum value, an angle θ$_l$ formed between the second end 142 of the first rope member 14 and the first arm 1320 has a minimum value, and an angle θ$_r$ formed between the second end 152 of the second rope member 15 and the second arm 1321 has a maximum value. Referring to FIG. 6, the first rope member 14 is connected to the first arm 1320 through the second end 142 thereof and then wound on the small wheel 1311 so as to be connected to the spring 12 through the first end 141 thereof. The second rope member 15 is connected to the second arm 1321 through the second end 152 thereof and then wound on the small wheel 1311, passes through the through hole 13101 of FIG. 2 and is wound on the big wheel 1310 so as to be connected to the sliding unit 11 through the first end 151 thereof.

Referring to FIG. 5A, when a force W (such as the weight of the display) is applied to the sliding unit 11 that is located at the highest position, the wheel group 131 rotates in a counter-clockwise direction. That is, when the display carried by the sliding unit 11 moves downward (for example, through a deflecting pulley, not shown), the second rope member 15 is pulled downward by the force W to cause the big wheel 1310 and the small wheel 1311 to move, thereby shortening the portion of the second end 152 of the second rope member 15 that is exposed from the small wheel 1311. Then, referring to FIG. 6, the second arm 1321 and the first arm 1320 are caused to rotate in a counter-clockwise direction so as to pull the second end 142 of the first rope member 14 and shorten the portion of the second end 142 of the first rope member 14 that is exposed from the small wheel 1311, thus stretching the spring 12.

Figure 7:
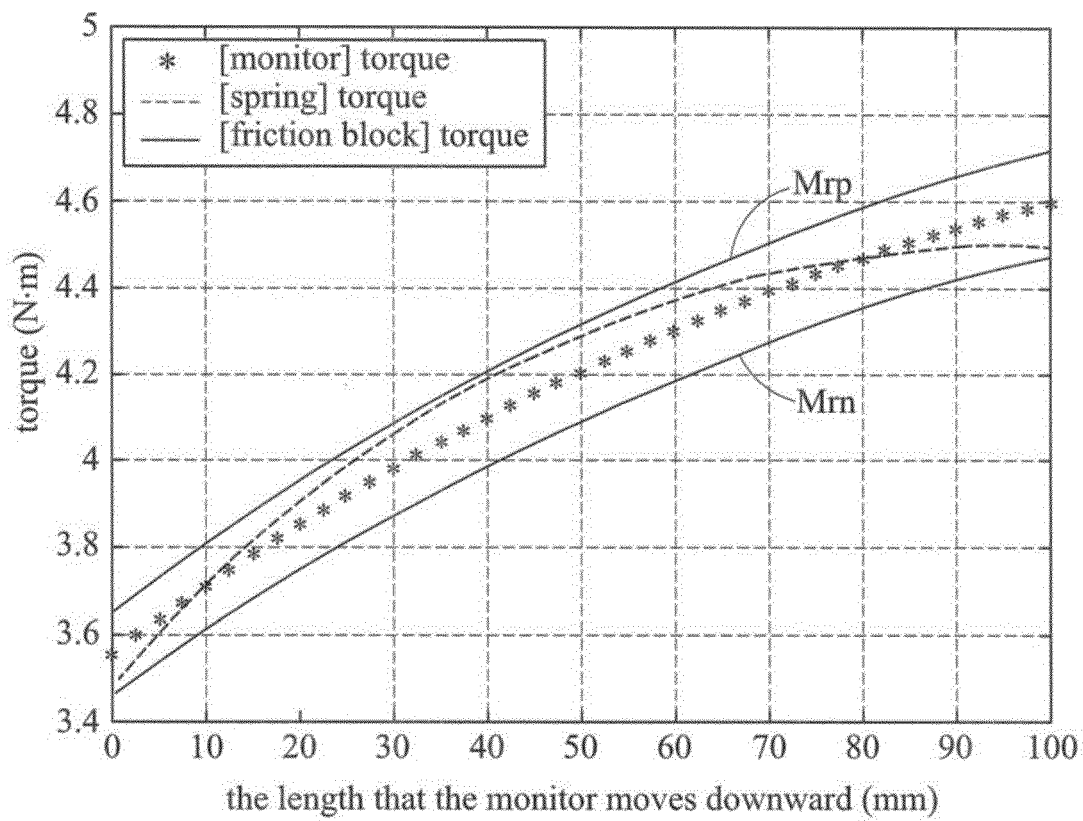
FIG. 7 is a plot showing torque analysis of the display lifting device according to the present invention.

In an exemplified embodiment, the vertical distance H from the pivot axis of the rock arm member 132 to the axis of the wheel group 131 is 40 mm, the horizontal distance w from the pivot axis of the rock arm member 132 to the axis of the wheel group 131 is 8 mm, the first arm L$_l$ of the rock arm member 132 has a length of 20 mm, the second arm L$_r$ has a length of 32 mm, the small wheel of the wheel group 131 has a diameter d$_1$ of 8 mm, the big wheel of the wheel group 131 has a diameter d$_2$ of 40 mm, and the angle α between the first arm 1320 and the second arm 1321 is 148 degree. Further, the spring constant K$_s$ of the spring is 0.37 N/m, a predefined frictional force F$_u$ is 0.4 N. FIG. 7 is a plot showing torque analysis of the exemplified embodiment of the display lifting device.

Referring to FIG. 7, when the torque generated by the spring is greater than the torque generated by the display, since the positive torque Mrp generated by the friction block is greater than the difference between the torque of the spring and the torque of the display, the difference between the torque of the spring and the torque of the display can be offset by the positive torque Mrp so as to prevent the rock arm member 132 from rotating in a clockwise direction. That is, the display is prevented from moving upward. Contrarily, when the torque of the display is greater than the torque of the spring, since the negative torque Mrn is less than the difference between the torque of the display and the torque of the spring, the difference between the torque of the display and the torque of the spring can be offset by the negative torque Mrn, thereby preventing the rock arm member 132 from rotating in a counter-clockwise direction. That is, the display is prevented from moving downward. Therefore, a static equilibrium can be achieved for the display at any position. That is, the display can stop at any position.

The present invention provides a mechanism of static equilibrium in which torques on the first arm and the second arm change continuously as the position of the display changes. Compared with the conventional display lifting device that produces substantially fixed torques and requires a constant force spring, the present invention eliminates the need of a constant force spring and instead only needs an ordinary spring, thereby simplifying elements and facilitating the assembly process.

Therefore, the present invention achieves a static equilibrium effect through a rock arm member. Compared with the conventional display lifting device and assembly method, the present invention provides simplified elements so as to facilitate the assembly process, overcome the conventional manufacturing difficulty of a cam contour and reduce the fabrication cost. Therefore, the present invention provides a new-type mechanism of static equilibrium for a display lifting device.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A display lifting device, comprising:
   a body;
   an adjusting unit having a wheel group having a big wheel and a small wheel coaxially disposed on the body, a shaft fixed to the body, and a rock arm member pivotally fixed to the shaft and having a first arm and a second arm extending outward from the shaft;
   a spring having a first end fixed to the body;
   a first rope member wound on the small wheel and having one end connected to the first arm and the other end connected to a second end of the spring;
   a second rope member wound on the small wheel and the big wheel and having one end connected to the second arm; and
   a sliding unit connected to the other end of the second rope member and used for carrying a display such that the display is movable between a first position and a second position,
   wherein a first angle is formed between the first rope member and the first arm and a second angle is formed between the second rope member and the second arm, when the display moves from the first position toward the second position, the second rope member is pulled to cause the second arm and the first arm to pivotally rotate relative to the shaft and thereby cause the first rope member to stretch the spring such that the first angle and the second angle vary with extension of the spring, thus keeping a sum of torques produced on the first arm and the second arm with respect to the shaft equal to zero.

2. The device of claim 1, wherein the big wheel has a through hole through which the second rope member wound on the small wheel passes so as to be wound on the big wheel.

3. The device of claim 2, further comprising a base pivotally connected to the body through a hinge.

4. The device of claim 2, wherein an angle is formed between the first arm and the second arm.

5. The device of claim 4, wherein the angle is an obtuse angle.

6. The device of claim 2, wherein the first arm has a first groove connected with the first rope member, and the second arm has a second groove connected with the second rope member.

7. The device of claim 2, wherein the sliding unit comprises at least an outer rail fixed to the body, an inner rail slidingly disposed on the outer rail, and a sliding block fixed to the inner rail.

8. The device of claim 7, further comprising a cover disposed on the body and positioned between the sliding block and the body.

9. The device of claim 7, wherein the sliding block further comprises a friction block positioned at a side of the sliding block close to the body, and wherein a frictional force between the friction block and the body is adjusted by tightening or loosening a first screw.

10. The device of claim 2, wherein the first end of the spring is fixed to the body through a second screw, and the tension of the spring is adjusted by screwing in or out the second screw.

11. The device of claim 2, wherein the second end of the spring has a gradually narrowed structure that fixes the first rope member therein.

12. The device of claim 2, wherein the big wheel and the small wheel have a diameter ratio ranging from 1.5:1 to 15:1.

* * * * *